US008605229B2

(12) United States Patent
Park et al.

(10) Patent No.: US 8,605,229 B2
(45) Date of Patent: Dec. 10, 2013

(54) LIQUID CRYSTAL DISPLAY DEVICE INCLUDING LED LIGHT SOURCE

(75) Inventors: Byung-In Park, Gumi-si (KR); Chul Park, Gumi-si (KR)

(73) Assignee: LG. Display Co. Ltd., Seoul (KR)

( * ) Notice: Subject to any disclaimer, the term of this patent is extended or adjusted under 35 U.S.C. 154(b) by 526 days.

(21) Appl. No.: 12/625,104

(22) Filed: Nov. 24, 2009

(65) Prior Publication Data
US 2010/0253872 A1 Oct. 7, 2010

(30) Foreign Application Priority Data

Apr. 1, 2009 (KR) .......................... 10-2009-0028218

(51) Int. Cl.
*G02F 1/1333* (2006.01)
*G02F 1/1335* (2006.01)

(52) U.S. Cl.
USPC .................. 349/58; 349/60; 349/64; 349/65; 349/113

(58) Field of Classification Search
USPC ................. 349/58–60, 64, 65, 113; 361/368
See application file for complete search history.

(56) References Cited

U.S. PATENT DOCUMENTS

| 2004/0004827 A1* | 1/2004 | Guest | 362/31 |
| 2008/0225203 A1* | 9/2008 | Kim | 349/65 |
| 2011/0007235 A1* | 1/2011 | Chang | 349/58 |

FOREIGN PATENT DOCUMENTS

| CN | 101017274 A | 8/2007 | |
| CN | 101539258 A | 12/2008 | |
| JP | 2005099619 A * | 4/2005 | ............... G09F 9/00 |
| JP | 2008066152 A * | 3/2008 | |
| JP | 2008292559 A * | 12/2008 | |

OTHER PUBLICATIONS

Office Action issued in corresponding Chinese Patent Application No. 200910208794.X, mailed Jul. 29, 2011.

* cited by examiner

*Primary Examiner* — Huyen Ngo
(74) *Attorney, Agent, or Firm* — Brinks Gilson & Lione (57) ABSTRACT

A liquid crystal display device includes a support main having a rectangular frame shape, a reflection sheet in the support main, a light guide plate over the reflection sheet, a light-emitting diode (LED) assembly including a plurality of LEDs arranged along a side surface of the light guide plate, a reflection tape covering the LED assembly and the side surface of the light guide plate, a plurality of optical sheets over the light guide plate, a liquid crystal panel over the plurality of optical sheets, a cover bottom at a rear surface of the reflection sheet and having at least one side wall, and a top cover covering edges of a front surface of the liquid crystal and combined with the support main and the cover bottom, wherein the reflection tape contacts the at least one side wall.

7 Claims, 6 Drawing Sheets

LIQUID CRYSTAL DISPLAY DEVICE INCLUDING LED LIGHT SOURCE

This application claims the benefit of Korea Patent Application No. 10-2009-0028218, filed on Apr. 1, 2009, the entire contents of which is incorporated herein by reference for all purposes as if fully set forth herein.

BACKGROUND

1. Field of the Invention

The disclosure relates to a liquid crystal display device, and more particularly, to a liquid crystal display device including a light-emitting diode (LED) light source.

2. Discussion of the Related Art

Liquid crystal display (LCD) devices are most widely used for monitors of notebook computers, monitors of personal computers and televisions due to excellent moving images and high contrast ratio. LCD devices use the optical anisotropy and polarization properties of liquid crystal molecules of a liquid crystal layer to produce an image.

An LCD device includes two substrates spaced apart and facing each other and a liquid crystal layer interposed between the two substrates. The alignment direction of the liquid crystal molecules is controlled by varying the intensity of an electric field applied to the liquid crystal layer, and the transmittance of light through the liquid crystal layer is changed.

The LCD devices require an additional light source because the LCD devices are not self-luminescent. Therefore, a backlight unit is disposed at a rear side of a liquid crystal (LC) panel and emits light into the LC panel, whereby discernible images can be displayed.

Backlight units include cold cathode fluorescent lamps (CCFLs), external electrode fluorescent lamps (EEFLs), and light emitting diodes (LEDs) as a light source. Among these, LED lamps have been widely used due to their small sizes, low power consumption, and high reliability.

Figure 1:
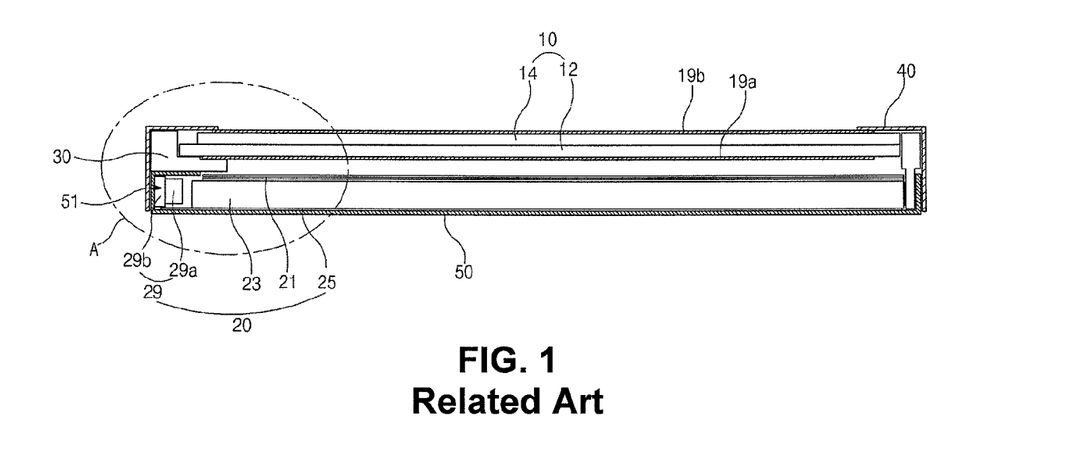
FIG. 1 is a cross-sectional view illustrating a liquid crystal display (LCD) module including LEDs as a light source according to the related art.

FIG. 1 is a cross-sectional view illustrating a liquid crystal display (LCD) module including LEDs as a light source according to the related art.

In FIG. 1, the related art LCD module includes a liquid crystal panel 10, a backlight unit 20, a support main 30, a top cover 40 and a cover bottom 50.

The liquid crystal panel 10 displays images and includes first and second substrates 12 and 14 facing and attached to each other with a liquid crystal layer (not shown) interposed therebetween. Polarizers 19a and 19b are attached at front and rear surfaces of the liquid crystal panel 10 and control the polarization of light.

The backlight unit 20 is disposed at a rear side of the liquid crystal panel 10. The backlight unit 20 includes an LED assembly 29, a reflection sheet 25, a light guide plate 23 and a plurality of optical sheets 21. The LED assembly 29 is disposed at an edge of at least one side of the support main 30 along a length direction. The reflection sheet 25 is disposed over the cover bottom 50 and is white- or silver-colored. The light guide plate 23 is disposed over the reflection sheet 25. The plurality of optical sheets 21 are disposed over the light guide plate 23.

More particularly, the LED assembly 29 is disposed at a side of the light guide plate 23. The LED assembly 29 includes a plurality of LEDs 29a emitting white light and a printed circuit board (PCB) 29b on which the LEDs 29a are mounted.

Edges of the liquid crystal panel 10 and the backlight unit 20 are surrounded by the support main 30 having a rectangular frame shape. The top cover 40 covers edges of the front surface of the liquid crystal panel 10, and the cover bottom 50 covers a rear surface of the backlight unit 20. The top cover 40 and the cover bottom 50 are combined with the support main 30 to thereby constitute one-united body.

Figure 2:
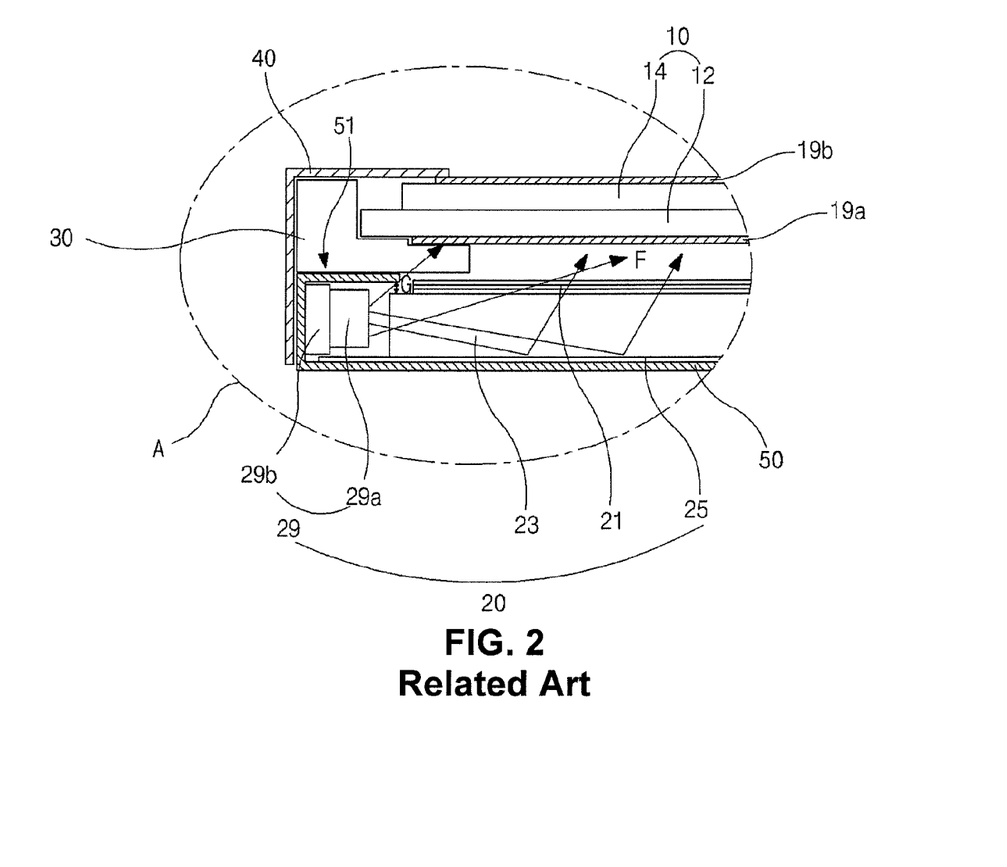
FIG. 2 is a cross-sectional view of enlarging an area A of FIG. 1.

FIG. 2 is a cross-sectional view of enlarging an area A of FIG. 1. In FIG. 2, the LEDs 29a are arranged along the side of the light guide plate 23 of the modularized LCD module, and the LEDs 29a are mounted on the PCB 29b to constitute the LED assembly 29. The LED assembly 29 is fixed such that light emitted from the LEDs 29a faces a side surface of the light guide plate 23, which the light is incident on. To do this, the cover bottom 50 has a side that is twice bent upward and inward and which is referred to as a bending portion 51. The LED assembly 29 is attached to the bending portion 51 by an adhesive material such as a both-sided sticky tape. The structure may be referred to as a side top view type.

Accordingly, light F emitted from the LEDs 29a is incident on the side surface of the light guide plate 23 and then are refracted toward the liquid crystal panel 10 inside the light guide plate 23. With light reflected by the reflection sheet 25, the light is changed to have uniform brightness and high qualities through the plurality of optical sheets 21 and are provided to the liquid crystal panel 10. Accordingly, the liquid crystal panel 10 displays images.

There is a gap G between the light guide plate 23 and the bending portion 51 of the cover bottom 50. Some of the light F emitted from the LEDs 29a are leaked through the gap G, and there is light leakage. This lowers the brightness and image qualities of the LCD device.

BRIEF SUMMARY

Accordingly, the present invention is directed to a liquid crystal display device including an LED light source that substantially obviate one or more of the problems due to limitations and disadvantages of the related art.

An advantage of the present invention is to provide a liquid crystal display device including an LED light source that prevents the light leakage.

Another advantage of the present invention is to provide a liquid crystal display device including an LED light source that has the improved brightness and image qualities.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes a support main having a rectangular frame shape, a reflection sheet in the support main, a light guide plate over the reflection sheet, a light-emitting diode (LED) assembly including a plurality of LEDs arranged along a side surface of the light guide plate, a reflection tape covering the LED assembly and the side surface of the light guide plate, a plurality of optical sheets over the light guide plate, a liquid crystal panel over the plurality of optical sheets, a cover bottom at a rear surface of the reflection sheet and having at least one side wall, and a top cover covering edges of a front surface of the liquid crystal and combined with the support main and the cover bottom, wherein the reflection tape contacts the at least one side wall.

In another aspect, a liquid crystal display device includes a support main having a side wall, a reflection sheet in the support main, a light guide plate over the reflection sheet, a light-emitting diode (LED) assembly disposed at a side surface of the light guide plate and attached to the side wall, a reflection tape covering the LED assembly and the side surface of the light guide plate, a plurality of optical sheets over the light guide plate, a liquid crystal panel over the plurality of optical sheets, and a top cover covering edges of a front surface of the liquid crystal and combined with the support main.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to embodiments of the present invention, examples of which are illustrated in the accompanying drawings.

Figure 3:
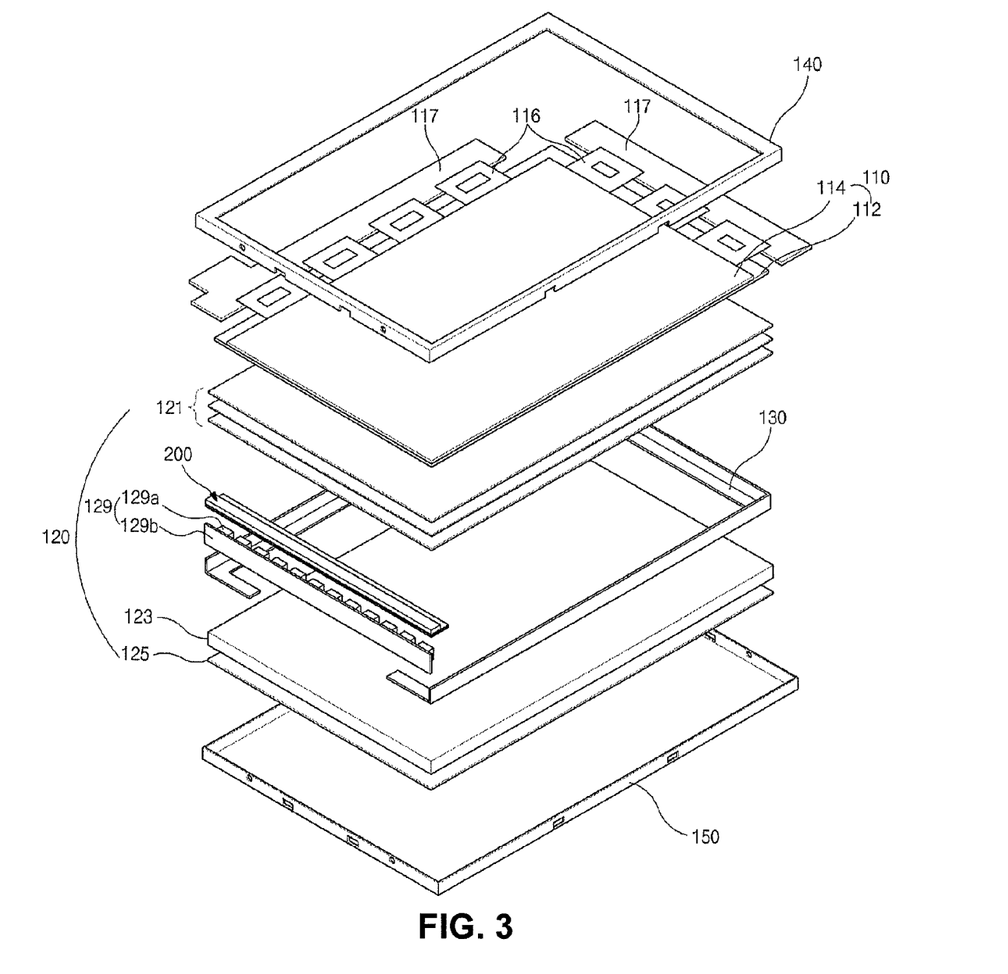
FIG. 3 is an exploded perspective view of illustrating an LCD module according to a first embodiment of the present invention.

FIG. 3 is an exploded perspective view of illustrating an LCD module according to a first embodiment of the present invention.

In FIG. 3, an LCD module includes a liquid crystal panel 110, a backlight unit 120, a support main 130, a top cover 140 and a cover bottom 150.

More particularly, the liquid crystal panel 110 displays images. The liquid crystal panel 110 includes first and second substrates 112 and 114 facing and attached to each other with a liquid crystal layer interposed therebetween. In an active matrix-type, although not shown in the figure, gate lines and data lines are formed on an inner surface of the first substrate 112, which may be referred to as a lower substrate or an array substrate. The gate lines and the data lines cross each other to define pixel regions. A thin film transistor (TFT) is formed at each crossing point of the gate and data lines, and a pixel electrode is connected to the thin film transistor at each pixel region. The pixel electrode may be formed of a transparent conductive material.

A black matrix and red, green and blue color filter patterns are formed on an inner surface of the second substrate 114, which may be referred to as an upper substrate or a color filter substrate. The color filter patterns correspond to the pixel regions, respectively. The black matrix surrounds each of the color filter patterns and covers the gate lines, the data lines, and the thin film transistors. A transparent common electrode is formed over the color filter patterns and the black matrix.

Polarizers (not shown) are attached to outer surfaces of the first and second substrates 112 and 114 and selectively transmit linearly polarized light.

A printed circuit board 117 is attached to at least a side of the liquid crystal panel 110 via connecting means 116 such as flexible printed circuit boards or tape carrier packages (TCPs), for example. The printed circuit board 117 is bent toward a side surface of the support main 130 or a rear surface of the cover bottom 150 during a module assembly process.

In the liquid crystal panel 110, on/off signals from gate driving circuits are provided to the thin film transistors through the gate lines, and when the thin film transistors selected by each gate line turn on, data signals from data driving circuits are provided to the pixel electrodes through the data line. According to this, an electric field is induced between the pixel electrodes and the common electrode, and the arrangement of the liquid crystal molecules is changed by the electric field to thereby change transmittance of light. Therefore, the liquid crystal panel 110 displays variances in the transmittance as images.

The backlight unit 120 is disposed under the liquid crystal panel 110 and provides light to the liquid crystal panel 110 so that the variances in the transmittance of the liquid crystal panel 110 are shown to the outside.

The backlight unit 120 includes a light-emitting diode (LED) assembly 129, a reflection sheet 125 of a white or silver color, a light guide plate 123 over the reflection sheet 125, and optical sheets 121 over the light guide plate 123.

The LED assembly 129 is disposed at a side of the light guide plate 123 such that the LED assembly 129 faces a side surface of the light guide plate 123, which light is incident on. The LED assembly 129 includes a plurality of LEDs 129a and a printed circuit board (PCB) 129b on which the LEDs 129a are mounted to be spaced apart from each other.

The LEDs 129a include red (R), green (G) and blue (B) LEDs respectively emitting red, green and blue light toward the side surface of the light guide plate 123. A white light is produced by lighting the RGB LEDs 129a up at a time and by mixing the red, green and blue light.

Alternatively, each of the LEDs 129a may include an LED chip emitting red, green and blue light, and each LED 129a may produce a white light. The LED 129a may include a chip emitting a white light and emit a full white light.

Meanwhile, the LEDs 129a respectively emitting red, green and blue light may be mounted as a cluster, and the plurality of LEDs 129a may be arranged on the PCB 129b in a line or in several lines. The LEDs 129a may be mounted on an FPC (not shown) in addition to the PCB 129b.

The light guide plate 123 totally reflects light emitted from the LEDs 129a several times such that the light moves through the inside of the light guide plate 123 and are uniformly scattered. Accordingly, an initial flat light source is provided to the liquid crystal panel 110. To provide a uniform flat light source, the light guide plate 123 may include predetermined patterns at its rear surface.

To guide the light incident on the inside of the light guide plate 12, the patterns may be elliptical patterns, polygonal patterns or hologram patterns. The patterns may be formed by a printing method or an injecting method.

The reflection sheet 125 is disposed under the rear surface of the light guide plate 123. The reflection sheet 125 reflects light passing through the rear surface of the light guide plate 123 toward the liquid crystal panel 110 to increase the brightness.

The optical sheets 121 over the light guide plate 123 include a diffuser sheet and at least a light-concentrating sheet. The optical sheets 121 diffuse or concentrate light passing through the light guide plate 123 such that more uniform flat light source is provided to the liquid crystal panel 110.

In the present embodiment, a reflection tape 200 is attached to upper portions of the side surface of the light guide plate 123 and the LED assembly 129 in the context of the figure. The reflection tape 200 shields light beyond a display area of the liquid crystal panel 110, and light leakage is prevented.

The liquid crystal panel 110 and the backlight unit 120 are modularized with the top cover 140, the support main 130 and the cover bottom 150. The top cover 140 has a rectangular frame shape with an L-shaped cross-section to cover edges of a front surface and side surfaces of the liquid crystal panel 110. A front surface of the top cover 140 has an opening, wherein images of the liquid crystal panel 110 are displayed through the opening.

The cover bottom 150, which the liquid crystal panel 110 and the backlight unit 120 are disposed over and which is a base of the liquid crystal display module, has a rectangular plate shape, and four edges of the cover bottom 150 are bent perpendicularly toward the liquid crystal panel 110. Thus, the cover bottom 150 may include a bottom wall and four side walls.

The support main 130 has a rectangular frame shape with an opened side. The support main 130 is disposed over the cover bottom 150 and surrounds edges of the liquid crystal panel 110 and the backlight unit 120. The support main 130 is combined with the top cover 140 and the cover bottom 150.

The top cover 140 may be referred to as a case top or a top case, the support main 130 may be referred to as a guide panel, a main support or a mold frame, and the cover bottom 150 may be referred to as a bottom cover or a lower cover.

The backlight unit 120 having the above-mentioned structure may be referred to as a side light type. The LEDs 120a may be arranged on the PCB 129b in several lines according to purposes. Furthermore, one or more LED assemblies 129 may be disposed at each of opposite side walls of the cover bottom 150 facing each other and may correspond to each other.

As stated above, the reflection tape 200 blocks light leakage outside the display area of the liquid crystal panel 110. This will be explained in more detail with reference to FIG. 4.

Figure 4:
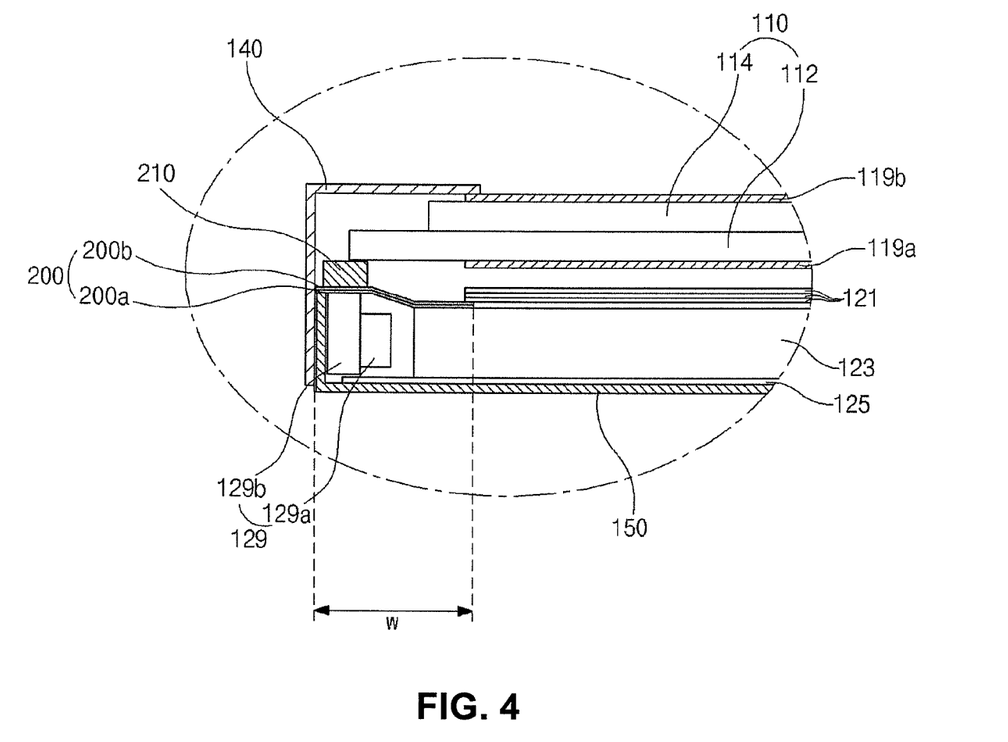
FIG. 4 is a cross-sectional view of schematically illustrating a part of a modularized LCD device of FIG. 3.

FIG. 4 is a cross-sectional view of schematically illustrating a part of a modularized liquid crystal display (LCD) device of FIG. 3. In FIG. 4, the reflection sheet 125, the light guide plate 123, the LED assembly 129 at the side of the light guide plate 123, and the plurality of optical sheets 121 over the light guide plate 123 constitute the backlight unit 120.

The liquid crystal panel 110 is disposed over the backlight unit 120 and includes the first and second substrates 112 and 114 and the liquid crystal layer (not shown) interposed therebetween. The polarizers 119a and 119b selectively transmitting light are attached at outer surfaces of the first and second substrates 112 and 114, respectively.

The edges of the backlight unit 120 and the liquid crystal panel 110 are surrounded by the support main 130. The support main 130 is combined with the cover bottom 150 disposed at the rear surface of the backlight unit 120 and the top cover 140 surrounding the edges of the front surface and the side surfaces of the liquid crystal panel 110.

The LED assembly 129 is attached to one side wall of the cover bottom 150 by an adhesive material, for example, a both-sided sticky tape, such that the PCB 129b contacts an inner surface of the side wall of the cover bottom 150.

Accordingly, light emitted from the LEDs 129a faces the side surface of the light guide plate 123 and are incident on the side surface of the light guide plate 123. The light is refracted toward the liquid crystal panel 110 inside the light guide plate 123. With light reflected on by the reflection sheet 125, the light is changed to have uniform brightness and high qualities while passing through the plurality of optical sheets 121 and is provided to the liquid crystal panel 110.

Here, the reflection tape 200 is attached to upper portions of the LED assembly 129 and the side surface of the light guide plate 123 in the context of the figure.

The reflection tape 200 includes a base film 200b of a polyethylene terephthalate (PET) resin and an adhesive material layer 200a. The reflection tape 200 has a bar shape with a length corresponding to a length of the PCB 129b of the LED assembly 129. The length of the reflection tape 200 may equal to the length of the PCB 129b. The reflection tape 200, beneficially, has a width "w" to cover the PCB 129b of the LED assembly 129, the light guide plate 123, and the side wall of the cover bottom 150.

Accordingly, light, which is emitted from the LEDs 129a and is incident on the light guide plate 123, progress in the light guide plate 123 due to several total reflections and uniformly spread out in the light guide plate 123.

While there exists light leakage that some of light emitted from the LEDs 29a go to the liquid crystal panel 10 through the gap G between the bending portion 51 of the cover bottom 50 and the light guide plate 23 in the related art of FIG. 2, the light leakage is prevented by the reflection tape 200 in the present invention.

In the meantime, the reflection tape 200 further includes a pad portion 210 on an upper surface of the base film 200b. The pad portion 210 protrudes along a direction parallel to the length of the reflection tape 200 and supports a side of the liquid crystal panel 100.

As stated above, the LCD device according to the present invention includes the reflection tape 200 covering the side surface of the light guide plate 123, the LED assembly 129, and the side wall of the cover bottom 150, and the light leakage can be prevented. Furthermore, the brightness and the image qualities of the LCD device are improved.

Recently, to provide LCD devices having large size, light weight and low volume, various methods have been suggested and developed. In the present invention, by reducing the weight of the backlight unit, an LCD device with light weight can be provided. This will be explained hereinafter in more detail with reference to FIG. 5.

Figure 5:
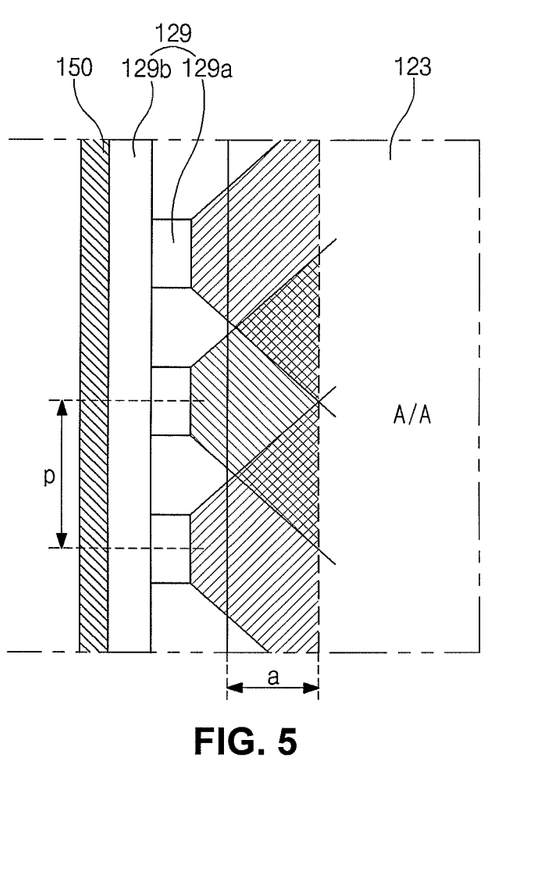
FIG. 5 is a view of schematically illustrating an LED assembly according to the present invention.

FIG. 5 is a view of schematically illustrating an LED assembly according to an embodiment of the present invention.

In FIG. 5, the LED assembly 129 includes a plurality of LEDs 129a and a PCB 129b. Each of the plurality of LEDs 129a emits one of red, green and blue light. The plurality of LEDs 129a are mounted on the PCB 129b by a surface mount technology (SMT) and are spaced apart from one another. The number of LEDs 129a mounted on the PCB 129b depends on a factor a/p, wherein "a" is a distance such that light from the LEDs 129a is incident on a light guide plate 123 and are mixed to produce a white light, and "p" is a distance between adjacent LEDs 129a.

More particularly, light is emitted from the LEDs 129a within a range of 120 degrees to 180 degrees. The light from adjacent two or three LEDs 129a is overlapped and mixed with each other in the light guide plate 123, and then provided to the liquid crystal panel 110 of FIG. 4 as a plane light source. Here, "a" is a distance from the side surface of the light guide plate 123 to an active area A/A displaying images, where the light from the LEDs 129a are overlapped and mixed with each other.

The distance "a" has a predetermined value. If the distance "a" is shorter than the predetermined value, a region for overlapping light from the LED is small, and uniform white light cannot be produced. This causes a lamp mura phenomenon in the active area A/A. Moreover, the display qualities of the LCD device are lowered due to the non-uniform brightness. Accordingly, the distance "a" may be fixed and designed to have a maximum value.

Meanwhile, when the factor a/p is less than 0.7, hot spots may occur. Accordingly, it is desirable to determine the number of LEDs 129a mounted on the PCB 129b so that the factor a/p is not less than 0.7. When the distance "a" is fixed and designed to have the predetermine value, the distance "p" is also fixed and designed so that the factor a/p is not less than 0.7. The distance "p" is defined as the following equation (1).

$$p = \text{(maximum area for arranging LEDs)} / \{\text{(the number of LEDs)} - 1\} \quad \text{Equation (1)}$$

The equation (1) can be expressed by the following equation (2).

$$\text{The number of LEDs} = \{\text{(maximum area for arranging LEDs)}/p\} + 1 \quad \text{Equation (2)}$$

Here, the number of LEDs depends on the maximum area for arranging LEDs because the distance "p" has a fixed value. That is, the number of LEDs can be decreased by reducing the maximum area for arranging LEDs.

Figure 6:
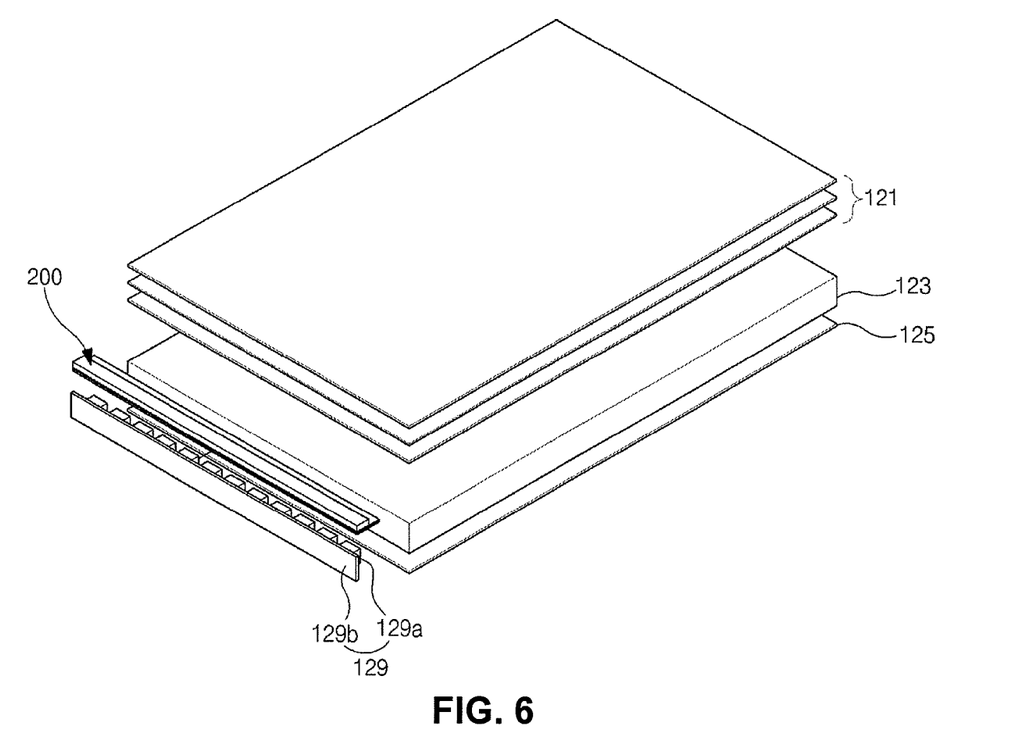
FIG. 6 is a view of schematically illustrating a position of an LED assembly according to the present invention.

In the present invention, to reduce the maximum area for arranging the LEDs 129a, the LED assembly 129 is disposed at one of two short sides of the light guide plate 123, which are shorter than the other two long sides, as shown in FIG. 6. Therefore, all the light emitted from the LEDs 129a of the LED assembly 129 are incident on the light guide plate 123, and the number of LEDs 129a is reduced, whereby an LCD device of relatively light weight is provided as compared to the related art LCD device having the same size.

Generally, the PCB 129b may be a metal PCB, which is formed of a metallic material having high thermal conductivity such as aluminum (Al) or copper (Cu). By decreasing the size of the PCB 129b, costs can be reduced, and the weight of the LCD device can be further decreased. Even though the number of LEDs 129a is decreased, the same image qualities and the brightness as the related art can be obtained.

Table 1 is a data of measuring the brightness of the LCD device according to the first embodiment of the present invention, in which the LED assembly 129 is disposed at the short side of the light guide plate 123.

TABLE 1

| White coordinates | | Brightness |
|---|---|---|
| x | Y | cd/m² |
| 0.302 | 0.318 | 204 |
| 0.302 | 0.318 | 209 |

TABLE 1-continued

| White coordinates | | Brightness |
|---|---|---|
| x | Y | cd/m² |
| 0.303 | 0.319 | 202 |
| 0.303 | 0.319 | 193 |
| 0.301 | 0.316 | 213 |
| 0.303 | 0.318 | 197 |
| 0.300 | 0.314 | 217 |
| 0.302 | 0.316 | 201 |
| 0.303 | 0.317 | 191 |
| 0.306 | .0322 | 228 |
| 0.304 | 0.321 | 195 |
| 0.306 | 0.324 | 142 |
| 0.304 | 0.323 | 284 |
| 0.305 | 0.320 | 153 |
| 0.305 | 0.320 | 228 |
| 0.301 | 0.316 | 189 |
| 0.304 | 0.318 | 138 |
| Average | | |
| | | 203 |

Figure 7:
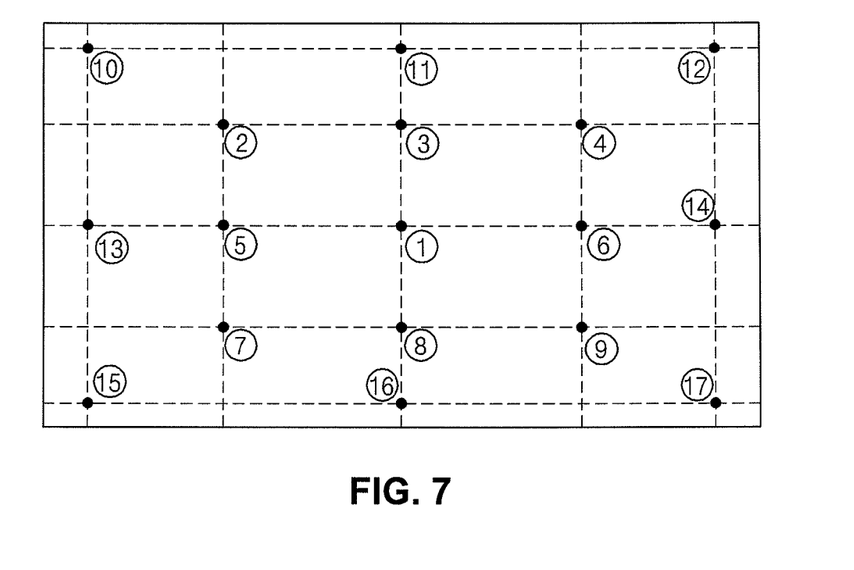
FIG. 7 is a view of schematically illustrating points for measuring the brightness.

Table 1 shows the value of the brightness at each point of the LCD device displaying images. As shown in FIG. 7, the points are determined from crossing points of lines, which divide the active area for images into 6 sections vertically and horizontally, respectively, wherein first and sixth sections have a length corresponding to 1/16 of a length of the active area vertically or horizontally, and second, third, fourth and fifth sections have the same length larger than the length of the first and sixth sections. Accordingly, the brightness is measured at each of 8 outer points (10, 11, 12, 13, 14, 15, 16 and 17) and 9 inner points (1, 2, 3, 4, 5, 6, 7, 8 and 9).

The uniformity of the entire brightness can be judged from the average of the brightness. In the LCD device of the present invention, the average of the brightness is 203 cd/m². An LCD device, generally, has the reference brightness of about 200 to about 220 cd/m². Therefore, even though the LCD device of the present invention includes less LEDs 129a, the LCD device of the present invention has the brightness corresponding to the reference brightness. Moreover, the driving voltage for the LEDs 129a can be lowered due to the decreased LEDs 129a, and the power consumption of the LCD device can be reduced.

Meanwhile, by omitting the cover bottom 150 of FIG. 4, the LCD device of the present invention can have further reduced weight and volume. This will be explained in more detail with reference to FIGS. 8A and 8B.

Figure 8A:
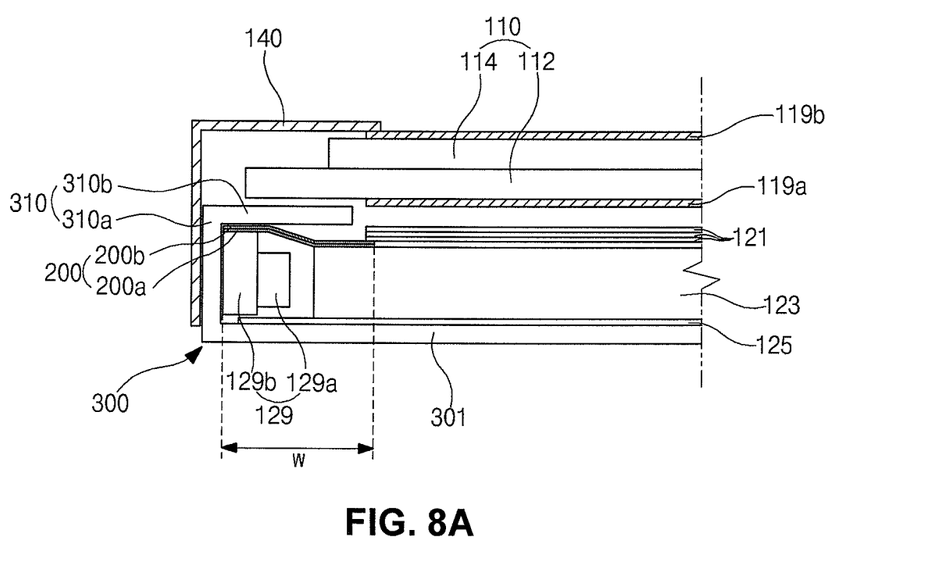
FIGS. 8A and 8B are cross-sectional views of schematically illustrating a part of a modularized liquid crystal display (LCD) device according to a second embodiment of the present invention.
Figure 8B:
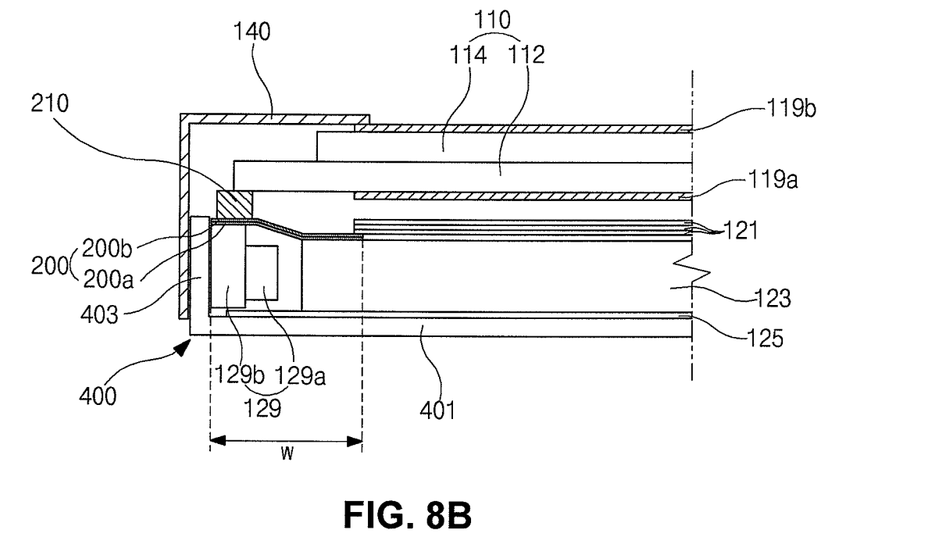

FIGS. 8A and 8B are cross-sectional views of schematically illustrating a part of a modularized liquid crystal display (LCD) device according to a second embodiment of the present invention. In the second embodiment, the same parts as the first embodiment of FIG. 4 may have the same references, and explanation for the same parts may be omitted.

In FIGS. 8A and 8B, the LCD device includes a liquid crystal panel 110 and a backlight unit. The liquid crystal panel 110 includes first and second substrates 112 and 114 and a liquid crystal layer (not shown) interposed therebetween. The backlight unit is disposed at a rear surface of the liquid crystal panel 110 and provides light to the liquid crystal panel 110.

In FIG. 8A, edges of the backlight unit and the liquid crystal panel 110 are surrounded by a support main 300. The support main 300 is combined with a top cover 140 surrounding edges of a front side and side surfaces of the liquid crystal panel 110, and the backlight unit and the liquid crystal panel 110 are modularized as one-united body.

The backlight unit includes a reflection sheet 125, a light guide plate 123, an LED assembly 129 at a side of the light guide plate 123, and a plurality of optical sheets 121 over the light guide plate 123. The LED assembly 129 includes LEDs 129a, each of which emit one of red, green and blue lights, and a PCB 129a, which the LEDs 129a spaced apart from each other are mounted on.

In FIG. 8A, the support main 300 has a rectangular frame shape surrounding the edges of the backlight unit and the liquid crystal panel 110. The support main 300 includes a bottom wall 301, which the reflection sheet 125 is disposed on, and a bending portion 310 at a side of the bottom wall 301. The bending portion 310 is twice bent upward and inward from the side of the bottom wall 301.

The LED assembly 129 is attached to the bending portion 310 of the support main 300 by an adhesive material (not shown) such as a both-sided sticky tape.

More particularly, the bending portion 310 includes a first bending side 310a and a second bending side 310b. The first bending side 310a protrudes upward from the side of the bottom wall 301 with an opened inner side facing the light guide plate 123 and is perpendicular to the bottom wall 301. The second bending side 310b is perpendicular with the first bending side 310a and is parallel to the bottom wall 301. The LED assembly 129 is disposed in the bending portion 310 along a length direction such that a bottom surface of the PCB 129b is attached to an inner surface of the first bending side 310a.

Here, the support main 300 functions as the cover bottom 150 of FIG. 4. That is, the liquid crystal panel 110 and the backlight unit are disposed over the support main 300, and the support main 300 is a base of the liquid crystal display module. Therefore, the cover bottom 150 of FIG. 4 can be omitted.

According, the LCD device having light weight and thin thickness can be provided, and modularizing time and costs can be reduced.

At this time, a reflective layer (not shown) having relatively high reflectivity may be formed on an inner surface of the bending portion 310 of the main support 300, which faces the LED assembly 129. The reflective layer may be formed by applying proper resin to the inner surface of the bending portion 310 or may be composed of a side of the reflection sheet 125, which may have the same shape as the inner surface of the bending portion 310 and may be close to the inner surface of the bending portion 310. Light loss can be prevented by the reflective layer, and light emitted from the LEDs 129a can be concentrated toward the side of the light guide plate 123.

Accordingly, light emitted from the LEDs 129a faces a side surface of the light guide plate 123 and is incident on the side surface of the light guide plate 123. The light is refracted toward the liquid crystal panel 110 inside the light guide plate 123. With light reflected on by the reflection sheet 125, the light is changed to have uniform brightness and high qualities while passing through the plurality of optical sheets 121 and is provided to the liquid crystal panel 110.

At this time, the LED assembly 129 is disposed at one of two short sides of the light guide plate 123, which are shorter than the other two long sides. Therefore, all the light emitted from the LEDs 129a of the LED assembly 129 are incident on the light guide plate 123, and the number of LEDs 129a is reduced. As compared to the related art LCD device having the same size, the size of the PCB 129b and areas of components such as FPC (not shown) for connection of a driving circuit (not shown) of the backlight unit can be decreased, so that the LCD device has relatively light weight and costs is reduced. Furthermore, power consumption of the LCD device is lowered.

In the meantime, a reflection tape 200 is attached to upper portions of the side surface of the light guide plate 123 and the LED assembly 129 in the context of the figure. The reflection tape 200 shields light beyond a display area of the liquid crystal panel 110, and light leakage is prevented.

The reflection tape 200 includes a base film 200b of a polyethylene terephthalate (PET) resin and an adhesive material layer 200a. The reflection tape 200 has a bar shape with a length corresponding to a length of the PCB 129b of the LED assembly 129. The length of the reflection tape 200 may equal to the length of the PCB 129b. The reflection tape 200, beneficially, has a width "w" to cover the PCB 129b of the LED assembly 129 and the side surface of the light guide plate 123.

Accordingly, while there exists light leakage that some of light emitted from the LEDs 29a directly go to the liquid crystal panel 10 in the related art of FIG. 2, the light leakage is prevented by the reflection tape 200 in the present invention. The brightness and image qualities of the LCD device can be improved.

In FIG. 8B, the support main 400 has a rectangular frame shape surrounding the edges of the backlight unit and the liquid crystal panel 110. The support main 400 includes a bottom wall 401, which the reflection sheet 125 is disposed on, and a side of the bottom wall 401 is bent upward.

More particularly, the support main 400 includes a side wall 403 protruding upward from the side of the bottom wall 401 and perpendicular to the bottom wall 401. The side wall 403 corresponds to the first bending side 310a of FIG. 8A. The LED assembly 129 is fixed at the side wall 403 by an adhesive material (not shown) such as a both-sided sticky tape such that a bottom surface of the PCB 129b is attached to an inner surface of the side wall 403.

A reflection tape 200 is attached to upper portions of the side surface of the light guide plate 123 and the LED assembly 129 in the context of the figure. The reflection tape 200 includes a pad portion 210 on an upper surface of the reflection tape 200. The pad portion 210 protrudes along a direction parallel to the length of the reflection tape 200 and supports a side of the liquid crystal panel 100.

As stated above, in the second embodiment of the present invention, the cover bottom 150 of FIG. 4 is omitted, and the support main 300 or 400 functions as the cover bottom 150 of FIG. 4. Therefore, the LCD module can have relatively thin thickness. In addition, the cover bottom 150 of FIG. 4 is formed of a metallic material, and costs can be reduced due to omission of the cover bottom 150 of FIG. 4.

Moreover, the LED assembly 129 is disposed at the short side of the light guide plate 123, and the number of LEDs 129a is decreased. As compared to the related art LCD device having the same size, the size of the PCB 129b and areas of components such as FPC (not shown) for connection of a driving circuit (not shown) of the backlight unit can be decreased, so that the LCD device has relatively light weight and costs is reduced. Furthermore, power consumption of the LCD device is lowered.

In the present invention, the reflection tape 200 is attached to upper portions of the side surface of the light guide plate 123 and the LED assembly 129, and light leakage is prevented. Accordingly, the brightness and the image qualities of the LCD device are improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A liquid crystal display device, comprising:
a support main having a rectangular frame shape;
a reflection sheet in the support main;
a light guide plate over the reflection sheet;
a light-emitting diode (LED) assembly including a plurality of LEDs arranged along a side surface of the light guide plate;
a reflection tape covering the LED assembly and the side surface of the light guide plate;
a plurality of optical sheets over the light guide plate;
a liquid crystal panel over the plurality of optical sheets and displaying images;
a cover bottom at a rear surface of the reflection sheet and having at least one side wall; and
a top cover covering edges of a front surface of the liquid crystal panel and combined with the support main and the cover bottom,
wherein the reflection tape contacts the at least one side wall,
wherein the reflection tape is disposed between the LED assembly and the liquid crystal panel, and
wherein the reflection tape overlaps a polarizer disposed on an outer surface of the liquid crystal panel.

2. The device according to claim 1, wherein the reflection tape includes a base film and an adhesive material, and the adhesive material is attached to the LED assembly, the light guide plate and the at least one side wall of the cover bottom.

3. The device according to claim 2, wherein the reflection tape further includes a pad portion on the base film along a direction parallel to a length of the reflection tape to support a side of the liquid crystal panel.

4. The device according to claim 1, wherein the light guide plate includes first, second, third and fourth sides, the first and second sides are shorter than the third and fourth sides, and the LED assembly is disposed at one of the first and second sides.

5. The device according to claim 1, wherein the LED assembly further includes a printed circuit board, which the plurality of LEDs spaced apart from each other are mounted on.

6. The device according to claim 1, wherein each of the plurality of LEDs emits one of red, green and blue light.

7. The device according to claim 1, wherein each of the plurality of LEDs emits white light.

* * * * *